United States Patent
Ohwada et al.

(10) Patent No.: US 9,108,357 B2
(45) Date of Patent: Aug. 18, 2015

(54) MULTILAYER DECORATIVE FILM

(75) Inventors: Takahiko Ohwada, Osaka (JP); Jörg Büchner, Bergisch-Gladbach (DE); Holger Mundstock, Wermelskirchen (DE)

(73) Assignee: Bayer Intellectual Property GmbH, Monheim (DE)

( * ) Notice: Subject to any disclaimer, the term of this patent is extended or adjusted under 35 U.S.C. 154(b) by 20 days.

(21) Appl. No.: 13/885,287

(22) PCT Filed: Nov. 15, 2011

(86) PCT No.: PCT/EP2011/070098
§ 371 (c)(1),
(2), (4) Date: May 14, 2013

(87) PCT Pub. No.: WO2012/065966
PCT Pub. Date: May 24, 2012

(65) Prior Publication Data
US 2013/0236719 A1 Sep. 12, 2013

(30) Foreign Application Priority Data
Nov. 19, 2010 (JP) .................................. 2010-259122

(51) Int. Cl.
*B29C 69/00* (2006.01)
*C09J 7/02* (2006.01)
(Continued)

(52) U.S. Cl.
CPC ............... *B29C 69/00* (2013.01); *B29C 51/002* (2013.01); *B44C 1/105* (2013.01);
(Continued)

(58) Field of Classification Search
CPC ........ B29C 69/00; B29C 51/02; B29C 51/14; B29C 51/16; B29C 51/002; B29C 2791/006; B29C 2791/007; C09J 7/02; C09J 7/0296; C09J 175/04; C09J 2201/61; C09J 2475/00; B44C 1/05; C08G 18/792; C08G 18/5024; C08L 75/06

USPC ............ 156/60, 242; 264/241, 263, 266, 571, 264/245
See application file for complete search history.

(56) References Cited

U.S. PATENT DOCUMENTS 3,907,974 A * 9/1975 Smith .......................... 428/346
4,543,393 A 9/1985 Blum et al.
(Continued)

FOREIGN PATENT DOCUMENTS

DE 102006058527 A1 6/2008
EP 922720 A1 6/1999
(Continued)

OTHER PUBLICATIONS

English Translation of Three dimension Overlay Method (TOM Process), Library of decoration for plastics, Technical Information Institute Co., Ltd., 2008, pp. 216-228, cited at page 1, lines 5-6 of Specification.
(Continued)

*Primary Examiner* — Thao T Tran
(74) *Attorney, Agent, or Firm* — Drinker Biddle & Reath LLP

(57) ABSTRACT

The present invention relates to a process for overlaying a base substance with a multilayer decorative film in a vacuum forming, a multilayer decorative film for a secondary decoration used in such a vacuum forming process, to a multilayer decorative film excellent in adhesiveness, workability, and secondary physical properties such as heat resistance and hydrolysis resistance after forming and the use of such multilayer decorative film in a vacuum forming process.

7 Claims, 1 Drawing Sheet

(51) Int. Cl.
  *B29C 51/00* (2006.01)
  *B44C 1/10* (2006.01)
  *C08G 18/50* (2006.01)
  *C08G 18/79* (2006.01)
  *C09J 175/04* (2006.01)
  *B29C 51/02* (2006.01)
  *B29C 51/10* (2006.01)
  *B29C 51/14* (2006.01)
  *B29C 51/16* (2006.01)

(52) U.S. Cl.
  CPC ......... *C08G 18/5024* (2013.01); *C08G 18/792* (2013.01); *C09J 7/02* (2013.01); *C09J 7/0296* (2013.01); *C09J 175/04* (2013.01); *B29C 51/02* (2013.01); *B29C 51/10* (2013.01); *B29C 51/14* (2013.01); *B29C 51/16* (2013.01); *B29C 2791/006* (2013.01); *B29C 2791/007* (2013.01); *C09J 2201/61* (2013.01); *C09J 2475/00* (2013.01); *Y10T 156/10* (2015.01); *Y10T 428/254* (2015.01)

(56) References Cited

U.S. PATENT DOCUMENTS

| | | | | |
|---|---|---|---|---|
| 4,550,052 A * | 10/1985 | Malek | ............ | 428/323 |
| 5,132,148 A | 7/1992 | Reafler | | |
| 5,286,528 A | 2/1994 | Reafler | | |
| 6,348,548 B1 | 2/2002 | Abend | | |
| 7,498,380 B2 * | 3/2009 | Ganster et al. | ............ | 524/589 |
| 2002/0022680 A1 | 2/2002 | Guse et al. | | |
| 2002/0151671 A1 | 10/2002 | Richter et al. | | |
| 2003/0077420 A1 | 4/2003 | Brodil et al. | | |
| 2003/0134125 A1 | 7/2003 | Facke et al. | | |
| 2005/0124714 A1 | 6/2005 | Weikard et al. | | |
| 2008/0135171 A1 | 6/2008 | Gruber et al. | | |
| 2008/0145624 A1 | 6/2008 | Weikard et al. | | |
| 2008/0171208 A1 | 7/2008 | Buchner et al. | | |
| 2008/0220250 A1 | 9/2008 | Ortmeier et al. | | |
| 2009/0061215 A1 | 3/2009 | Baumgart et al. | | |
| 2011/0143128 A1 * | 6/2011 | Saitou et al. | ............ | 428/336 |
| 2011/0171476 A1 | 7/2011 | Gruber et al. | | |

FOREIGN PATENT DOCUMENTS

| | | |
|---|---|---|
| EP | 1448735 A2 | 8/2004 |
| EP | 1541649 A1 | 6/2005 |
| EP | 1547764 A1 | 6/2005 |
| EP | 1658905 A1 | 5/2006 |
| JP | 10-58895 | 3/1998 |
| JP | 2000-79796 | 3/2000 |
| JP | 3937231 B2 | 6/2007 |
| JP | 4130583 B2 | 8/2008 |
| WO | WO-2005080484 A1 | 9/2005 |
| WO | WO-2005099943 A2 | 10/2005 |
| WO | WO-2005118689 A1 | 12/2005 |
| WO | WO-2006048109 A1 | 5/2006 |
| WO | WO-2008052665 A2 | 5/2008 |

OTHER PUBLICATIONS

International Search Report for PCT/EP2011/070098 mailed Apr. 5, 2012.

* cited by examiner ns357B2
MULTILAYER DECORATIVE FILM

RELATED APPLICATIONS

This application is a national stage application (under 35 U.S.C. §371) of PCT/EP2011/070098, filed Nov. 15, 2011, which claims benefit of Japanese Patent Application No. 2010-259122, filed Nov. 19, 2010, which is incorporated by reference herein.

The present invention relates to a process for overlaying a base substance with a multilayer decorative film in a thermo forming, in particular a vacuum forming, for example, in the Three dimension Overlay Method (hereinafter referred to as "TOM process") described in Japanese Patent No. 3937231 and Library of decoration for plastics, Technical Information Institute Co., Ltd., 2008, page 219-228, section 5-3, a multilayer decorative film for a secondary decoration used in such a thermo forming process, in particular vacuum forming process, to a multilayer decorative film excellent in adhesiveness, workability, and secondary physical properties such as heat resistance and hydrolysis resistance after forming and the use of such multilayer decorative film in in a thermo forming process, in particular in a vacuum forming process.

As a multilayer decorative film used in vacuum forming, a secondary decoration forming process, conventionally, multilayer decorative films that an adhesive layer is previously coated have been proposed. For example, there are known a tacky adhesion system such as polyacrylic resin and polyamide resin, an uncured hot-melt system such as polyolefin resin and EVA resin described in JP-A 2000-79796 and JP-A 10-58895, and a latent-type urethane reaction system using blocked isocyanate described in Japanese Patent No. 4130583.

For example, there is described a method in which after a design layer is formed using a printing technique described in JP-A 2000-79796, an adhesive layer is coated by a knife coater, then dried at 50° C. to obtain a multilayer decorative film (Latest trend of decoration technology for plastics, CMC Publishing Co., Ltd., 2010, page 151-157, section 5-2).

However, in regard to the multilayer decorative film using these adhesive layers, durability such as heat resistance and hydrolysis resistance of a product after forming in not only an interior application but also particularly an exterior application is regarded as a problem. This has been mostly the case of adhesives etc. of the tacky adhesion system where release paper is essential.

For solving these problems, according to the prior art it was needed to use a reversible hot-melt adhesive with a high melting point. Namely, for increasing heat resistance, it was needed to design the melting point of a hot-melt resin itself high. However, at the same time, since these techniques need heating at a temperature exceeding the melting point of the hot-melt resin in forming, it has been not suitable for a decorative film sensitive to temperature. A high design film with complicate concavity and convexity on a decorative film surface (emboss film) has been recently increased, for the appearance of a decorative film not to be damaged, there has been requested a decorative film for vacuum forming capable of heat forming at lower temperatures and short times.

On the other hand, EP-A 922 720 discloses a water dispersion material containing a solid surface-inactivated polyisocyanate and at least one kind of isocyanate reactive polymer. There is a description that this water dispersion material is a storage-stable, latent-reactive adhesive system in a preferable specific aspect, but there is no mention about applicability to a multilayer decorative film, besides, in the case of being used in a multilayer decorative film, there is neither any disclosure nor indication on whether the above-described problems are solved or not. Additionally, there is neither any disclosure nor indication of using such a latent-reactive adhesive material to a vacuum process, such as the TOM-Process.

The present invention is to solve the above-described problems, and to provide a process for overlaying a base substance with a multilayer decorative film in a thermo forming process, in particular in a vacuum forming process, which does not require high temperatures for forming the multilayer film including its adhesive layer. Additionally, the present invention is to solve the above-described problems, and to provide a multilayer decorative film with a good thermo-forming, in particular vacuum-forming property at a safe and intermediate temperature (for example from 70° C. to 150° C.), excellent in exhibition of a high initial adhesion force necessary to follow a 3D shape, and with very good durability after forming. Good heat resistance and hydrolysis resistance of the adhesive layer after adhesion preferably is also required. Furthermore, it is optionally to provide a multilayer decorative film requiring no release film or paper on an adhesive layer.

The present inventors keenly studied for solving the above-described problems, as a result, they have found the following process for overlaying abuse substance with a multilayer decorative film in a thermo forming process, in particular in a vacuum forming process, and multilayer decorative film and accomplished the present invention.

The present invention provides a process for overlaying a base substance with a multilayer decorative film in a thermo forming process, preferably in a vacuum forming process, characterized in that said process comprises the steps of (i) providing a multilayer decorative film comprising a hard coat layer (A), an adhesive layer (D), a base film layer and optionally a design layer between these layers (A) and (D), wherein the adhesive layer (D) comprises at least one of a latent-reactive adhesive, (ii) applying the adhesive layer (D) of said decorative film to the surface of a base substance, (iii) overlaying said base substance with said decorative film by heating at 70° C. or more.

Figure 1:
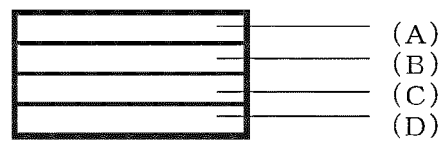
FIG. 1 shows a schematic of a multi-layer decorative film according to the invention.

The present invention provides a process for overlaying a base substance with a multilayer decorative film by thermo forming, in particular vacuum forming, characterized in that the multilayer decorative film is a multilayer film comprising a hard coat layer (A), an adhesive layer (D), a base film layer and optionally a design layer between these layers (A) and (D), characterized in that the adhesive layer (D) comprises at least one solid preferably surface-inactivated polyisocyanate (D1) with a melting point or a glass transition temperature of at least higher than 40° C. and a particle size of 200 μm or less, and at least one isocyanate reactive polymer (D2).

According to the present invention a process for overlaying abuse substance with a multilayer decorative film by vacuum forming is preferred. In said vacuum forming process the step (iii) of overlaying said base substance with said decorative film by heating at 70° C. or more is done in vacuum.

In preferred embodiments such a vacuum forming can be succeeded by further treatment with compressed air (pneumatic forming). In said pneumatic forming step the overlaying of said base substance with said decorative film by heating at 70° C. or more is finished by further treatment with compressed air, which is not done in vacuum.

Preferably the multilayer film comprises a hard coat layer (A), a base film layer (B), and an adhesive layer (D) in the order (A), (B) and (D). Optionally a design layer (C) can be present between the layers (A) and (B) or between the layers (B) and (D).

More preferably the multilayer film comprises a hard coat layer (A), a base film layer (B), a design layer (C), and an adhesive layer (D) in the order (A), (B), (C) and (D) or (A), (C), (B) and (D). More preferably the multilayer film comprises a hard coat layer (A), a base film layer (B), a design layer (C), and an adhesive layer (D) in the order (A), (B), (C) and (D).

Latent-reactive adhesives are known per se, for example from EP-A-0 922 720. In principle there are two solid phases in latent-reactive adhesives which therefore do not react with one another at room temperature or under normal environmental conditions. The substances undergo a chemical reaction with one another only when activated, for example by heating.

Preferably the adhesive layer (D) comprises at least one polyisocyanate (D1) having a melting point or a glass transition temperature of higher than 40° C. and at least one isocyanate-reactive polymer (D2).

That the polyisocyanate (D1) has a melting point or a glass transition temperature of higher than 40° C. means that the polyisocyanate can be a crystalline polyisocyanate having a melting point of higher than 40° C. or that the polyisocyanate can be an amorphous polyisocyanate having a glass transition temperature of higher than 40° C. The melting point or glass transition temperature can be measured with DSC (according to ASTM D 3418, heating rate 10 K/min, using the second heating). According to said ASTM D 3418 the glass transition temperature is the midpoint temperature. As an example for a crystalline polyisocyanate TDI-Dimer can be mentioned. As an example for an amorphous polyisocyanate IPDI-Trimer can be mentioned.

Preferably the adhesive layer (D) comprises at least one surface-inactivated polyisocyanate (D1) having a melting point or a glass transition temperature of higher than 40° C. and at least one isocyanate-reactive polymer (D2).

Preferably the adhesive layer (D) comprises at least one surface-inactivated polyisocyanate (D1) having a melting point or a glass transition temperature of higher than 40° C. and a particle size of 200 μm or less and at least one isocyanate-reactive polymer (D2).

Preferably the adhesive layer (D) comprises at least one solid surface-inactivated polyisocyanate (D1) with a melting point or a glass transition temperature of at least higher than 40° C. and a particle size of 200 μm or less, and at least one isocyanate reactive polymer (D2).

As a base substance for overlaying with the decorative multilayer film an optionally three dimensionally formed film, sheet or molded article can be used.

The present invention provides a multilayer decorative film characterized in that an adhesive layer (D) comprises at least one latent-reactive adhesive, preferably at least one polyisocyanate (D1) having a melting point or a glass transition temperature of higher than 40° C. and at least one isocyanate-reactive polymer (D2), more preferred at least one surface-inactivated polyisocyanate (D1) having a melting point or a glass transition temperature of higher than 40° C. and at least one isocyanate-reactive polymer (D2), most preferred at least one surface-inactivated polyisocyanate (D1) having a melting point or a glass transition temperature of higher than 40° C. and a particle size of 200 μm or less and at least one isocyanate-reactive polymer (D2). In a preferred embodiment the adhesive layer (D) comprises at least one solid surface-inactivated polyisocyanate (D1) with a melting point or a glass transition temperature of 40° C. or more and a particle size of 200 μm or less, and at least one isocyanate reactive polymer (D2).

The process and the multilayer decorative film of the present invention have several advantages. Since the multilayer decorative film of the present invention does not use an adhesive of a tacky adhesion system, optionally no release film or paper is required. However, the use of a release film or paper might be advantageous in special applications. Since an adhesive component used preferably is an aqueous dispersion material, there is no need to use a harmful organic solvent in coating to a decorative film, being friendly to working environment. Additionally, in particular by using a surface-inactivated polyisocyanate (D1) in the adhesive layer the multilayer decorative film coated with the adhesive layer can be stored for a significant time, e.g. 6 months at ambient temperature. In heating a decorative film when vacuum forming, high temperatures are not needed, further, it exhibits very good durability such as heat resistance and hydrolysis resistance. Since it shows good adhesiveness to many metal and plastic base materials, it can be used not only for decoration in applications to cellular phone, package of personal computer, air conditioner, television, refrigerator, and car interior, but also in severe applications requiring durability such as but not limited to wet heat resistance including application to car exterior.

FIG. 1 shows a pattern diagram of a multilayer decorative film of the present invention, having a hard coat layer (A), a base film layer (B), a design layer (C) and an adhesive layer (D).

Figure 2:
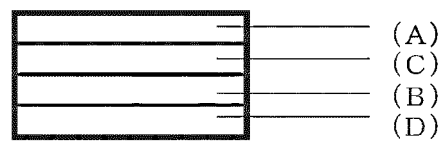
FIG. 2 shows a schematic of a multi-layer decorative film according to the invention.

FIG. 2 shows another pattern diagram of a multilayer decorative film of the present invention, having a hard coat layer (A), a design layer (C), a base film layer (B) and an adhesive layer (D).

Hereinafter, the present invention is further described in detail.

The adhesive layer (D) of the present invention can be formed by using an aqueous dispersion comprising at least one solid preferably surface-inactivated polyisocyanate (D1) having a melting point or a glass transition temperature of 40° C. or more and optionally a particle size of 200 μm or less, and at least one isocyanate reactive polymer (D2) as an adhesive.

The adhesive layer (D) of the present invention is characterized by being storage-stable and having a latent reactivity. Namely, at a temperature of +2° C. or less it has storage stability for a long period and, in particular, at ambient temperature it has a storage stability for 6 month. Additionally, it has a latent reactivity that after vacuum forming, e.g. based on an overlaying process, a final cross-linking bond can be formed by heat forming at a temperature of about more than 70° C.

With regard to a method for forming an adhesive layer (D) with storage stability and latent reactivity having a solid surface-inactivated polyisocyanate (D1) and isocyanate reactive polymer (D2) of the present invention, for example, it is possible to use the following method described in EP-A 922 720.

As one embodiment, in a method for forming an adhesive layer (D) using a preferably surface-inactivated polyisocyanate (D1) within the range of 40° C. to 220° C., preferably within the range of 40° C. to 180° C., more preferably within the range of 50° C. to 150° C., most preferably within the range of 70° C. to 150° C. in reaction temperature, the adhesive layer (D) can be formed by:

(a) a process for mixing an aqueous dispersion material of at least one preferably surface-inactivated polyisocyanate (D1) and at least one kind of isocyanate reactive polymer (D2) suspended or dissolved in water;
(b) a process for depositing the dispersion material of the process (a) on a substrate to form a layer with a predetermined thickness; and
(c) a process for removing water from the layer obtained in the process (b) at a temperature lower than the reaction temperature of the polyisocyanate to produce a solid layer (adhesive layer) practically dried having storage stability and latent reactivity.

Further, after the process (c), at a temperature exceeding the reaction temperature of the polyisocyanate (D1), the polyisocyanate (D1) is subjected to final cross-linking and hardening with the isocyanate reactive polymer (D2).

The water-removing process can be conducted at a temperature not exceeding the reaction temperature of the latent reactive adhesive. The water-removing process can be conducted at a temperature exceeding the softening temperature (melting point) of polymer (D2) or between room temperature and the softening temperature (melting point) of the polymer (D2.

The reaction temperature of the preferably surface-inactivated polyisocyanate is preferably in the range of 40 to 220° C., more preferably 40 to 180° C., and most preferably 50 to 150° C. and in a preferred embodiment 70 to 150° C. The melting point or the glass transition temperature of the preferably surface-inactivated polyisocyanate is preferably within the range of 40 to 150° C., more preferably 50 to 150° C., and most preferably 60 to 150° C.

When using an amorphous polyisocyanate, to start the crosslinking reaction between the polyisocyanate (D1) with the isocyanate reactive polymer (D2) the adhesive layer must be heated at a temperature exceeding the glass transition temperature of the polyisocyanate (D1) as well as the melting point of the isocyanate reactive polymer (D2). When using a crystalline polyisocyanate, to start the crosslinking reaction between the polyisocyanate (D1) with the isocyanate reactive polymer (D2) the adhesive layer must be heated at a temperature exceeding the melting point of the isocyanate reactive polymer (D2)

The ratio of an isocyanate group of the preferably surface-inactivated polyisocyanate to a hydroxyl and/or amino group of the isocyanate reactive polymer is preferably within the range of 0.1 to 1.5.

The above-described dispersion material can contain additives such as a hydroxy or amino functional powdery or liquid compound of low molecular weight to high molecular weight, a stabilizer, surfactant, corrosion-preventing agent, flame proofing agent, thickener, filler, and pigment.

The multilayer decorative film of the present invention is a multilayer decorative film comprising a hard coat layer (A), an adhesive layer (D), a base film layer and optionally a design layer between these layers (A) and (D), preferably comprising a hard coat layer (A), a base film layer (B), optionally a design layer (C), and an adhesive layer (D).

Preferably, the multilayer decorative film of the present invention is a multilayer decorative film comprising a hard coat layer (A), a base film layer (B), and an adhesive layer (D) in the order (A), (B) and (D). Optionally a design layer (C) can be present between the layers (A) and (B) or between the layers (B) and (D).

More preferably, the multilayer decorative film of the present invention is a multilayer decorative film comprising a hard coat layer (A), a base film layer (B), a design layer (C), and an adhesive layer (D) in the order (A), (B), (C) and (D) or (A), (C), (B) and (D). More preferably the multilayer film comprises a hard coat layer (A), a base film layer (B), a design layer (C), and an adhesive layer (D) in the order (A), (B), (C) and (D).

The hard coat layer (A) can be a coating layer prepared by a wet coating and subsequent drying and hardening step or prepared by an extrusion or coextrusion and optionally a subsequent hardening step.

Preferably, the hard coat layer (A) is prepared by using a coating composition comprising at least one binding agent that is capable of being cured with actinic radiation. Suitable binding agents are UV-curing polyurethane dispersions, UV-curing polyacrylate dispersions and also combinations thereof with one another and with UV-curing monomers; suitable furthermore are combinations of UV-curing polyurethane dispersions with polyacrylate dispersions.

Suitable commercial binding agents are available, for example, under the name Lux® from Alberdingk & Boley GmbH, Krefeld, Del., in particular the products Lux 1613, 241, 285, 331, 460, 480; furthermore, Laromer® from BASF AG, Ludwigshafen, DE, in particular the products LR 8949, 8983, 9005; furthermore, Bayhydrol® UV from Bayer MaterialScience AG, Leverkusen, DE, in particular Bayhydrol® UV 2282, VP LS 2317, VP LS 2280 and XP 2629; furthermore, Ucecoat® from Cytec Surface Specialities SA/NV, Brussels, BE, in particular Ucecoat® 7571, 7770, 7772, 7773, 7825 and 7849.

The production of suitable urethane (meth)acrylates having high glass-transition temperatures is described in detail in patent applications EP-A 1 448 735 and EP-A 1 541 649, for example. EP-A 1 448 735 describes the production of urethane (meth)acrylates having suitable glass-transition temperatures and low melt viscosity, and their use in powder lacquers. These products may be employed, dissolved in suitable organic solvents, as binding agents for suitable coating agents b). Further products are the urethane acrylates named in WO 2005/5080484, WO 2005/099943, WO 2005/118689, WO 2006/048109.

Suitable polyester (meth)acrylates are known. In particular, products that are commercially available as binding agents for UV-curing powder lacquers are suitable, dissolved in organic solvents; for example, Uvecoat® 2300 and 3003 from Cytec Surface Specialities BV/NV, Brussels, BE. Suitable (meth)acrylated polymers of vinylic monomers are likewise known. For example, Ebecryl® 1200 from Cytec Surface Specialities BV/NV, Brussels, BE. Suitable as constituents of the binding agents are, for example, urethane (meth)acrylates, polyester (meth)acrylates, epoxy (meth)acrylates and (meth)acrylated polymers such as polyacrylates. Urethane (meth)acrylates are preferred.

Examples for suitable binding agents and hard coat coating compositions are known to a skilled person in the art and for example given in WO 2008/052665 A2.

As an alternative, the hard coat layer (A) is coextruded together with the base film (B). As a material for extruding the hard coat layer (A) preferably poly- or copolyacrylate or poly- or copolymethacrylate resins are used.

The hard coat layer (A) can further comprise inorganic nanoparticles, in particular oxides, mixed oxides, hydroxides, sulfates, carbonates, carbides, borides or nitrides of main group elements of group II to IV of the Periodic table or the sub-group elements of group I to VIII of the Periodic Table including the lanthanoides. Preferred inorganic nanoparticles are oxides of silicon, aluminum, cerium, zirconium, niobium, zinc or titanium, particularly preferred are oxides of silicon or titanium.

The nanoparticles preferably have an average particle size of less than 200 nm, preferably from 5 to 100 nm, measured with dynamic light scattering in a dispersion as Z-average). Preferably more than 75%, more preferably more than 90% of the nanoparticles have the particle size mentioned before.

In preferred embodiments, the hard coat layer (A) is the one that PMMA is coextruded on a base film (B) of polycarbonate or the like, or a UV hardening resin such as urethane acrylate is coated and hardened, or PMMA is coextruded and further a UV hardening resin such as urethane acrylate is coated thereon and hardened, or the like. Further, it is also possible to provide, as needed, a protective layer of polyurethane resin, acrylic resin, PET, or the like thereon.

Suitable material for the base film layer (B) are polymeric resins like polycarbonates or copolycarbonates based on diphenols, poly- or copolyacrylates and poly- or copolymethacrylates such as, for example and preferably, polymethyl methacrylate, polymers or copolymers with styrene such as, for example and preferably, polystyrene or polystyrene-acrylonitrile (SAN) or acrylonitrile-butadiene-styrene (ABS), thermoplastic polyurethanes, as well as polyolefins such as, for example and preferably, polypropylene types or polyolefins based on cyclic olefins (e.g. TOPAS®, Hoechst) or poly vinyl chlorides (PVC), poly- or copolycondensates of terephthalic acid or naphthalene dicarboxylic acid such as, for example and preferably, poly- or copolyethylene terephthalate (PET or CoPET), glycol-modified PET (PETG) or poly- or copolybutylene terephthalate (PBT or CoPBT), poly- or copolyethylene naphthalate (PEN or CoPEN), polyacrylonitriles (PAN) or mixtures of the aforementioned.

As a material used in the base film layer (B), there are preferably used acrylic resins such as polymethyl methacrylate (PMMA), polycarbonate (PC) resins, vinyl chloride (PVC) resins, amorphous polyester (PET) resins, polypropylene (PP) resin, acrylonitrile-butadiene-styrene (ABS) resins, polyacrylonitrile (PAN) resins, and the like. These films coextruded or coated in multilayer can be used, above all, preferable is a film combined with polycarbonate (PC), ABS resin or acrylic (PMMA) resin, excellent in weathering resistance, surface hardness, three-dimensional formability, and transparency, and capable of satisfying high-level specifications for a car, building materials, and also being diverted to consumer-electronics.

The design layer (C) is formed using a colored base coat or an ink comprising a resin binder. As a resin binder is preferably used an acrylic resin, polycarbonate resin, polyvinyl resin, polyester resin, polypropylene resin, acrylonitrile-butadiene-styrene resin, polyacrylonitrile resin, polyamide resin, polyurethane resin, alkyd resin, cellulose acetobutyrate and the like, and various pigments or dyes. As a resin binder the binding agents aforementioned for the hard coat layer (A) are also and preferably suitable. An example for a colored base coat is Standohyd or Standox Mix from Company Standox.

Preferably, such base coats or inks are used for preparing the design layer (C), which are resulting in thermostable design layers after drying. In particular thermostable resin binder are used. Such thermostable resin binder are preferably based on acrylic resin or polycarbonate resin.

Suitable polycarbonate resins are preferably aromatic polycarbonates or copolycarbonates. The polycarbonates or copolycarbonates can be linear or branched.

The preparation of these polycarbonates or copolycarbonates can be carried out in a known manner from diphenols, carbonic acid derivatives, optionally chain terminators and optionally branching agents. The preparation of polycarbonates is well known to a skilled person in the art.

Suitable diphenols can be, for example, dihydroxyaryl compounds of the general formula (I)

$$HO-Z-OH \quad (I)$$

wherein Z is an aromatic radical having 6 to 34 C atoms, which can contain one or more optionally substituted aromatic nuclei and aliphatic or cycloaliphatic radicals or alkylaryls or hetero atoms as bridge members.

Non limited examples of suitable dihydroxyaryl compounds are: dihydroxybenzenes, dihydroxydiphenyls, bis-(hydroxyphenyl)-alkanes, bis-(hydroxyphenyl)-cycloalkanes, bis-(hydroxyphenyl)-aryls, bis-(hydroxyphenyl) ethers, bis-(hydroxyphenyl) ketones, bis-(hydroxyphenyl) sulfides, bis-(hydroxyphenyl) sulfones, bis-(hydroxyphenyl)-sulfoxides, 1',1-bis-(hydroxyphenyl)-diisopropylbenzenes, and nucleus-alkylated and nucleus-halogenated compounds thereof.

Preferred dihydroxyaryl compounds are, for example, resorcinol, 4,4'-dihydroxydiphenyl, bis-(4-hydroxyphenyl)-methane, bis-(3,5-dimethyl-4-hydroxyphenyl)-methane, bis-(4-hydroxyphenyl)-diphenyl-methane, 1,1-bis-(4-hydroxyphenyl)-1-phenyl)-ethane, 1,1-bis-(4-hydroxyphenyl)-1-(1-naphthyl)-ethane, 1,1-bis-(4-hydroxyphenyl)-1-(2-naphthyl)-ethane, 2,2-bis-(4-hydroxyphenyl)-propane, 2,2-bis-(3-methyl-4-hydroxyphenyl)-propane, 2,2-bis-(3,5-dimethyl-4-hydroxyphenyl)-propane, 2,2-bis-(4-hydroxyphenyl)-1-phenyl-propane, 2,2-bis-(4-hydroxyphenyl)-hexafluoro-propane, 2,4-bis-(4-hydroxyphenyl)-2-methyl-butane, 2,4-bis-(3,5-dimethyl-4-hydroxyphenyl)-2-methylbutane, 1,1-bis-(4-hydroxyphenyl)-cyclohexane, 1,1-bis-(3,5-dimethyl-4-hydroxyphenyl)-cyclohexane, 1,1-bis-(4-hydroxyphenyl)-4-methyl-cyclohexane, 1,3-bis-[2-(4-hydroxyphenyl))-2-propyl]-benzene, 1,1'-bis-(4-hydroxyphenyl)-3-diisopropyl-benzene, 1,1'-bis-(4-hydroxyphenyl)-4-diisopropyl-benzene, 1,3-bis-[2-(3,5-dimethyl-4-hydroxyphenyl)-2-propyl]-benzene, bis-(4-hydroxyphenyl))ether, bis-(4-hydroxyphenyl) sulfide, bis-(4-hydroxyphenyl)sulfone, bis-(3,5-dimethyl-4-hydroxyphenyl) sulfone and 2,2',3,3'-tetrahydro-3,3,3',3'-tetramethyl-1,1'-spirobi-[1H-indene]-5,5'-diol or dihydroxydiphenylcycloalkanes of the formula (Ia)

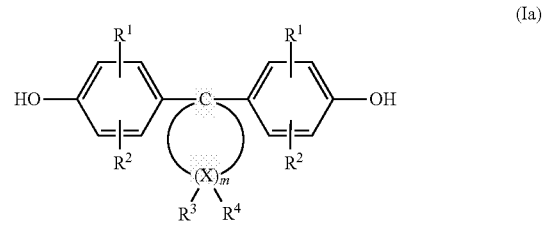

(Ia)

wherein $R^1$ and $R^2$ independently of one another denote hydrogen, halogen, preferably chlorine or bromine, $C_1$-$C_8$-alkyl, $C_5$-$C_6$-cycloalkyl, $C_6$-$C_{10}$-aryl, preferably phenyl, and $C_7$-$C_{12}$-aralkyl, preferably phenyl-$C_1$-$C_4$-alkyl, in particular benzyl, m denotes an integer from 4 to 7, preferably 4 or 5, $R^2$ and $R^4$ can be chosen individually for each X and independently of one another denote hydrogen or $C_1$-$C_6$-alkyl and X denotes carbon, with the proviso that on at least one atom X, $R^3$ and $R^4$ simultaneously denote alkyl. Preferably, in the formula (Ia)

$R^3$ and $R^4$ are simultaneously alkyl on one or two atom(s) X, in particular only on one atom X.

The preferred alkyl radical for the radicals $R^3$ and $R^4$ in formula (Ia) is methyl. The X atoms in the alpha position to the diphenyl-substituted C atom (C-1) are preferably not dialkyl-substituted, but in contrast alkyl disubstitution in the beta position to C-1 is preferred.

Particularly preferred dihydroxydiphenylcycloalkanes of the formulae (Ia) are those having 5 and 6 ring C atoms X in the cycloaliphatic radical (m=4 or 5 in formula (Ia)), for example the diphenols of the formulae (Ib) to (Id)

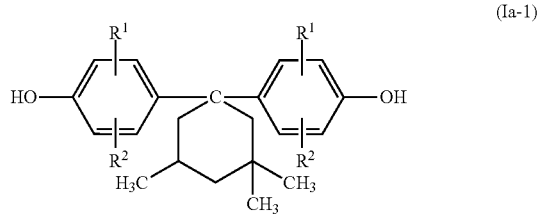

(Ia-1)

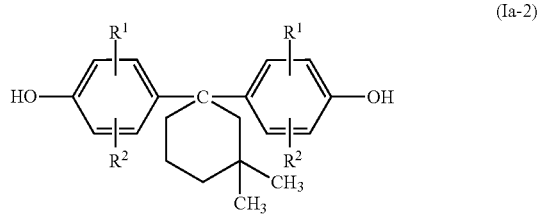

(Ia-2)

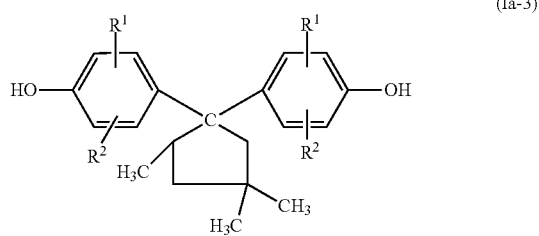

(Ia-3)

A very particularly preferred dihydroxydiphenylcycloalkane of the formula (Ia) is 1,1-bis-(4-hydroxyphenyl)-3,3,5-trimethyl-cyclohexane (formula (Ia-1) where $R^1$ and $R^2$ are H).

Such polycarbonates can be prepared in accordance with EP-A 359 953 from dihydroxydiphenylcycloalkanes of the formula (Ia).

Particularly preferred dihydroxyaryl compounds are resorcinol, 4,4'-dihydroxydiphenyl, bis-(4-hydroxyphenyl)-diphenyl-methane, 1,1-bis-(4-hydroxyphenyl)-1-phenyl-ethane, bis-(4-hydroxyphenyl)-1-(1-naphthyl)-ethane, bis-(4-hydroxyphenyl)-1-(2-naphthyl)-ethane, 2,2-bis-(4-hydroxyphenyl)-propane, 2,2-bis-(3,5-dimethyl-4-hydroxyphenyl)-propane, 1,1-bis-(4-hydroxyphenyl)-cyclohexane, 1,1-bis-(3,5-dimethyl-4-hydroxyphenyl)-cyclohexane, 1,1-bis-(4-hydroxyphenyl)-3,3,5-trimethyl-cyclohexane, 1,1'-bis-(4-hydroxyphenyl)-3-diisopropyl-benzene and 1,1'-bis-(4-hydroxyphenyl)-4-diisopropyl-benzene.

Very particularly preferred dihydroxyaryl compounds are 4,4'-dihydroxydiphenyl, 2,2-bis-(4-hydroxyphenyl)-propane and 1,1-bis-(4-hydroxyphenyl)-3,3,5-trimethyl-cyclohexane.

It is possible to use either one dihydroxyaryl compound to form homopolycarbonates or various dihydroxyaryl compounds to form copolycarbonates.

It is possible to use either one dihydroxyaryl compound of the formula (I) or (Ia) to form homopolycarbonates or several dihydroxyaryl compounds of the formula (I) and/or (Ia) to form copolycarbonates. In this context, the various dihydroxyaryl compounds can be linked to one another either randomly or blockwise. In the case of copolycarbonates from dihydroxyaryl compounds of the formula (I) and (Ia), the molar ratio of dihydroxyaryl compounds of the formula (Ia) to the other dihydroxyaryl compounds of the formula (I) optionally to be co-used is preferably between 99 mol % of (Ia) to 1 mol % of (I) and 2 mol % of (Ia) to 98 mol % of (I), preferably between 99 mol % of (Ia) to 1 mol % of (I) and 10 mol % of (Ia) to 90 mol % of (I) and in particular between 99 mol % of (Ia) to 1 mol % of (I) and 30 mol % of (Ia) to 70 mol % of (I).

A very particularly preferred copolycarbonate can be prepared using 1,1-bis-(4-hydroxyphenyl)-3,3,5-trimethyl-cyclohexane and 2,2-bis-(4-hydroxyphenyl)-propane as dihydroxyaryl compounds of the formula (Ia) and (I).

Suitable carbonic acid derivatives can be, for example, diaryl carbonates of the general formula (II)

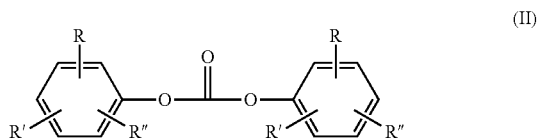

(II)

wherein

R, R' and R" independently of one another are identical or different and represent hydrogen, linear or branched $C_1$-$C_{34}$-alkyl, $C_7$-$C_{34}$-alkylaryl or $C_6$-$C_{34}$-aryl, R furthermore can also denote —COO—R''', wherein R''' represents hydrogen, linear or branched $C_1$-$C_{34}$-alkyl, $C_7$-$C_{34}$-alkylaryl or $C_6$-$C_{34}$-aryl.

Preferred diaryl carbonates are, for example, diphenyl carbonate, methylphenyl phenyl carbonates and di-(methylphenyl) carbonates, 4-ethylphenyl phenyl carbonate, di-(4-ethylphenyl) carbonate, 4-n-propylphenyl phenyl carbonate, di-(4-n-propylphenyl) carbonate, 4-iso-propylphenyl phenyl carbonate, di-(4-iso-propylphenyl) carbonate, 4-n-butylphenyl phenyl carbonate, di-(4-n-butylphenyl) carbonate, 4-iso-butylphenyl phenyl carbonate, di-(4-iso-butylphenyl) carbonate, 4-tert-butylphenyl phenyl carbonate, di-(4-tert-butylphenyl) carbonate, 4-n-pentylphenyl phenyl carbonate, di-(4-n-phenylphenyl) carbonate, 4-n-hexylphenyl phenyl carbonate, di-(4-n-hexylphenyl) carbonate, 4-iso-octylphenyl phenyl carbonate, di-(4-iso-octylphenyl) carbonate, 4-n-nonylphenyl phenyl carbonate, di-(4-n-nonylphenyl) carbonate, 4-cyclohexylphenyl phenyl carbonate, di-(4-cyclohexylphenyl) carbonate, 4-(1-methyl-1-phenylethyl)-phenyl phenyl carbonate, di-[4-(1-methyl-1-phenylethyl)-phenyl]carbonate, biphenyl-4-yl phenyl carbonate, di(biphenyl-4-yl) carbonate, 4-(1-naphthyl)-phenyl phenyl carbonate, 4-(2-naphthyl)-phenyl phenyl carbonate, di-[4-(1-naphthyl)-phenyl]carbonate, di-[4-(2-naphthyl)-phenyl]carbonate, 4-phenoxyphenyl phenyl carbonate, di-(4-phenoxyphenyl) carbonate, 3-pentadecylphenyl phenyl carbonate, di-(3-pentadecylphenyl) carbonate, 4-tritylphenyl phenyl carbonate, di-(4-tritylphenyl) carbonate, methyl-salicylate phenyl carbonate, di-(methyl-salicylate) carbonate, ethyl-salicylate phenyl carbonate, di-(ethyl-salicylate) carbonate, n-propyl-salicylate phenyl carbonate, di-(n-propyl-salicylate) carbonate, iso-propyl-salicylate phenyl carbonate, di-(iso-propyl-salicylate) carbonate, n-butyl-salicylate phenyl carbonate, di-(n-butyl-salicylate) carbonate, iso-butyl-salicylate phenyl carbonate, di-(iso-butyl-salicylate) carbonate, tert-butyl-salicylate phenyl carbonate, di-(tert-butyl-salicylate) carbonate, di-(phenyl-salicylate) carbonate and di-(benzyl-salicylate) carbonate.

Particularly preferred diaryl compounds are diphenyl carbonate, 4-tert-butylphenyl phenyl carbonate, di-(4-tert-butylphenyl) carbonate, diphenyl-4-yl phenyl carbonate, di-(biphenyl-4-yl) carbonate, 4-(1-methyl-1-phenylethyl)-phenyl phenyl carbonate, di-[4-(1-methyl-1-phenylethyl)-phenyl] carbonate and di-(methylsalicylate) carbonate.

Diphenyl carbonate is very particularly preferred.

It is possible to use either one diaryl carbonate or various diaryl carbonates.

To control or modify the end groups, for example, one or more monohydroxyaryl compound(s) which has/have not been used for the preparation of the diaryl carbonate(s) used can additionally be employed as chain terminators. In this context, these can be those of the general formula (III)

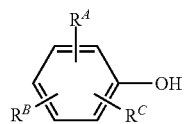

(III)

wherein
$R^A$ represents linear or branched $C_1$-$C_{34}$-alkyl, $C_7$-$C_{34}$-alkylaryl, $C_6$-$C_{34}$-aryl or COO—$R^D$, wherein
$R^D$ represents hydrogen, linear or branched $C_1$-$C_{34}$-alkyl, $C_7$-$C_{34}$-alkylaryl or $C_6$-$C_{34}$-aryl, and
$R^B$, $R^C$ independently of one another are identical or different and represent hydrogen, linear or branched $C_1$-$C_{34}$-alkyl, $C_7$-$C_{34}$-alkylaryl or $C_6$-$C_{34}$-aryl.

Such monohydroxyaryl compounds are, for example, 1-, 2- or 3-methylphenol, 2,4-dimethylphenol, 4-ethylphenol, 4-n-propylphenol, 4-iso-propylphenol, 4-n-butylphenol, 4-isobutylphenol, 4-tert-butylphenol, 4-n-pentylphenol, 4-n-hexylphenol, 4-iso-octylphenol, 4-n-nonylphenol, 3-pentadecylphenol, 4-cyclohexylphenol, 4-(1-methyl-1-phenylethyl)-phenol, 4-phenylphenol, 4-phenoxyphenol, 4-(1-naphthyl)-phenol, 4-(2-naphthyl)-phenol, 4-tritylphenol, methyl salicylate, ethyl salicylate, n-propyl salicylate, iso-propyl salicylate n-butyl salicylate, iso-butyl salicylate, tert-butyl salicylate, phenyl salicylate and benzyl salicylate.

4-tert-Butylphenol, 4-iso-octylphenol and 3-pentadecylphenol are preferred.

Suitable branching agents can be compounds having three and more functional groups, preferably those having three or more hydroxyl groups.

Suitable compounds having three or more phenolic hydroxyl groups are, for example, phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl))-benzene, 1,1,1-tri-(4-hydroxyphenyl)-ethane, tri-(4-hydroxyphenyl)-phenylmethane, 2,2-bis-(4,4-bis-(4-hydroxyphenyl)-cyclohexyl]-propane, 2,4-bis-(4-hydroxyphenyl)-isopropyl)-phenol and tetra-(4-hydroxyphenyl)-methane.

Other suitable compounds having three and more functional groups are, for example, 2,4-dihydroxybenzoic acid, trimesic acid (trichloride), cyanuric acid trichloride and 3,3-bis-(3-methyl-4-hydroxyphenyl)-2-oxo-2,3-dihydroindole.

Preferred branching agents are 3,3-bis-(3-methyl-4-hydroxyphenyl)-2-ox-2,3-dihydroindole and 1,1,1-tri-(4-hydroxyphenyl)-ethane.

Examples for suitable inks comprising polycarbonate resin based binders are Noriphan® inks from Pröll KG.

The base film (B) can be fully coated with such a base coat or ink or a pattern can be applied with one or more of such base coats or inks. As a method for forming a pattern, such as a letter/symbol pattern layer, there are an offset printing method, gravure method, flexographic printing method, screen printing method, and the like. When multiple color printing or gradation expression is done, an offset printing method or gravure method is suitable. In the case of fully coating, such as a plain color, it is possible to use a coat method such as gravure coat method, roll coat method, slot die coat method, and comma coat method. Additionally, the design layer can be formed on the upper side or lower side of a base film, or integrated with an adhesive layer or hard coat layer as well.

Suitable inks for forming the design layer can also comprise metal nanoparticles or metal flakes to achieve a metallic effect. Additionally, such inks comprising metal particles or flakes can preferably contain organic effect pigments.

The adhesive layer (D) preferably comprises at least one optionally and preferably surface-inactivated polyisocyanate (D1) with a melting point of higher than 40° C. and optionally a particle size of 200 μM or less, and at least one isocyanate reactive polymer (D2).

As a polyisocyanate used in (D1), all diisocyanates or polyisocyanates, or mixtures thereof are suitable as long as they have a melting point or glass transition temperature of higher than 40° C., and optionally they can be powdered into a particle size of 200 μM or less by a known method. They may be an aliphatic, alicyclic, heterocyclic, or aromatic diisocyanate or polyisocyanate. For example, there are listed diphenylmethane-4,4'-diisocyanate (MDI), dimer of 4,4'-MDI, naphthalene-1,5-diisocyanate (NDI), 3,3"-dimethyl-biphenyl-diisocyanate (TODI), dimer of 1-methyl-2,4-phenylene-diisocyanate (TDI-U), 3,3'-diisocyanate-4,4'-dimethyl-N,N'-diphenylurea (TDIH), an addition product of 2 mol of 1-methyl-2,4-phenylene-diisocyanate and 1 mol of 1,2-ethanediol or 1,4-butanediol, an addition product of 2 mol of MDI and 1 mol of diethylene glycol. Additionally, dimerization and trimerization products of isophorone diisocyanate (Desmodur® I, Bayer MaterialScience AG, Leverkusen), bis(4-isocyanatocyclohexyl)methane (Desmodur® W, Bayer MaterialScience AG, Leverkusen), ω,ω'-diisocyanato-1,3-dimethylcyclohexane (H6XDI), and mixtures of these dimerization products and trimerization products, and also mixed trimers of Desmodur® I/Desmodur® W, Desmodur® I/Desmodur® H (Desmodur® H=hexamethylene diisocyanate) Desmodur® W/Desmodur® H, Desmodur W/H6XDI. Desmodur® I/H6XDI can be employed as polyisocyanate (D1).

The above-described addition product does not merely show the advantages according to the present invention as an aqueous dispersion liquid. An addition product of 1-methyl-2,4-phenylene-diisocyanate and 1,4-butanediol or 1,2-ethanediol has a very advantageous property in a solid or liquid solvent-containing system or no solvent-containing system. These exhibit features particularly in regard to a low hardening or cross-linking temperature e.g. within the range lower than 90° C. Hence, use of this mixture, mainly based on either water or polyol, is very advantageous to covering and adhesion of a temperature-sensitive base substance.

Surface inactivation, namely, surface-stabilizing reaction can be carried out by various kinds of methods:

For example, it can be carried out by
dispersing powdery isocyanate in a solution of an inactivating agent, or supplying a melt of polyisocyanate of low melting point to a solution of an inactivating agent present
a in an insoluble liquid dispersion, or
adding an inactivating agent or its solution for purpose of dispersing a solid, finely powdered isocyanate.

The solid polyisocyanate used in (D1) is preferably inactivated with an inactivating agent such as primary and secondary aliphatic amine, diamine or polyamine, hydrazine derivative, amidine, and guanidine.

Preferred inactivating agents are ethylenediamine, 1,3-propylenediamine, diethylenetriamine, triethylenetetramine, 2,5-dimethyl-piperazine, 3,3'-dimethyl-4,4'-diamino-dicyclohexylmethane, methylnonanediamine, isophoronediamine, 4,4'-diaminodicyclohexylmethane, diamino- and triamino-polypropylene ether, polyamideamine, and a mixture of monoamine, diamine, and triamine, or the like.

The concentration of the inactivating agent is 0.2 to 25 equivalent %, preferably may be 0.5 to 8 equivalent %, relative to the total isocyanate groups present.

The preferred particle size of a powdery polyisocyanate is 0.1 to 200 µm, preferably 0.1 to 100 µm, most preferably 0.1 to 50 µm by dispersion after synthesis or wet friction-grinding. Preferably, the particle size is set within the range of 0.5 to 20 µM. Said particle size can be measured with laser diffraction according to ISO-13320 as d50 value. To obtain this particle size the solid-state polyisocyanates must be using suitable grinding methods, in ball, bead or sand mills, disk mills, friction-gap mills or jet mills, for example. For this, dissolving apparatus, dispersing device of rotor/stator type, stirring ball mill, bead mill, sand mill, ball mill, disk mill, jet mill or friction-gap mill is suitable in a temperature of 40° C. or less. According to polyisocyanate and applications, the grinding is conducted in the presence of an inactivating agent for inactivated polyisocyanate, or in the presence of water for polyisocyanate, followed by inactivation. The polyisocyanate that was ground and subjected to surface stabilization can be separated from the ground dispersion liquid, and dried.

For controlling the surface inactivation and cross-linking reaction, a catalyst can be added. The preferable one is a catalyst which has hydrolytic stability in aqueous solution or dispersion liquid, and later accelerates an activation reaction by heat. Examples of a urethane catalyst include organic tin, iron, lead, cobalt, bismuth, antimony and zinc compound, or a mixture thereof. An alkyl mercaptide compound of dibutyl tin is preferable because of higher hydrolytic stability. Suitable catalysts are known to a skilled person in the art and for example given in DE 10 2006 058 527 A1.

A nonvolatile polyurethane foam catalyst based on dimethylbenzylamine, diazabicyclo-undecene, and tertiary amine can be used for a special purpose, or in the combination with a metal catalyst.

The concentration of the catalyst is in the range of 0.001 to 3 weight %, relative to an adhesive-containing reactive system including polyisocyanate (D1) and at least one kind of isocyanate reactive polymer (D2), and preferably 0.01 to 1 weight %.

Water-soluble or water-dispersible emulsion or dispersion polymers bearing isocyanate-reactive functional groups are suitable as isocyanate reactive polymer (D2). These are produced according to the prior art by polymerisation of olefinically unsaturated monomers in solution, emulsion or suspension. The film-forming polymers contain 0.2 to 15%, preferably 1 to 8%, of monomers incorporated by polymerisation having isocyanate-reactive groups such as hydroxyl, amino, carboxyl, carbonamide groups.

Examples of the functional monomer include allyl alcohol, hydroxyethyl acrylate (and methacrylate), hydroxypropyl acrylate (and methacrylate), butanediol monoacrylate (and methacrylate), ethoxylated or propoxylated acrylate (or methacrylate), N-methylolacrylamide, tert-butylamino-ethyl methacrylate, acrylic acid, methacrylic acid, maleic acid, and maleic acid monoester. Glycidyl methacrylate and allyl glycidyl ether may also be copolymerized. These contain an epoxy group, which is derivatised in a further step with amines or amine alcohols to form the secondary amine, for example, ethylamine, ethylhexylamine, isononylamine, aniline, toluidine, xylidine, benzylamine, ethanolamine, 3-amino-1-propanol, 1-amino-2-propanol, 5-amino-1-pentanol, 6-amino-1-hexanol, 2-(2-aminoethoxy)ethanol. The conversion by the primary amine decreases a side reaction with water, and increases reactivity of the functional group of the polymer with the isocyanate group.

A water-soluble hydroxy functional binder is also suitable, such as polyvinyl alcohol, partially hydrolyzed polyvinyl acetate, hydroxyethyl cellulose, hydroxypropyl cellulose, and water-dispersible hydroxy functional polyester, hydroxy functional sulfo polyester, and polyurethane dispersion liquid, dispersion liquid of polyamideamine having a carboxyl, hydroxyl, primary or secondary amino group. Similarly, an aqueous colloidal dispersed material having a particle size of 1 to 100 nm, or a colloidal solution can be produced by a colloid mill starting from a thermoplastic polymer having an isocyanate reactive group. For example, it is a solid epoxy resin of high molecular weight, polyethylene vinyl alcohol, polyethylene-co-acrylic acid, and the like.

Preferably, the isocyanate reactive polymer (D2) is a crystalline or partly crystalline polyurethane polymer.

Preferably, the crystalline or partly crystalline polyurethane polymer has a melting point in the range between 42° C. and 100° C., particularly preferably in the range between 42° C. and 60° C., very particularly preferably in the range between 45° C. and 52° C.

Preferably, the crystalline or partly crystalline polyurethane polymer has a glass transition temperature in the range between −100° C. and −10° C., particularly preferably in the range between −60° C. and −40° C., measured by DSC in accordance with ASTM D 3418 (with a heating up rate of 10 K/min, using second heating, glass transition temperature as midpoint temperature).

Preferably, the crystalline or partly crystalline polyurethane polymer has a weight-average molecular weight Mw in the range between 20,000 and 250,000 g/mol, particularly preferably between 30,000 and 220,000 g/mol, very particularly preferably between 50,000 and 200,000 g/mol. The weight-average molecular weight is determined by means of gel permeation chromatography (GPC/SEC) with dimethylacetamide as the mobile phase.

In this connection, partly crystalline or crystalline means that in the DSC measurement in accordance with ASTM D 3418 at a heating up rate of 10 K/min, the polyurethane polymer has a melting peak which corresponds to a melt enthalpy in the range of from 106 J/g to 45 J/g, preferably in the range of from 101 J/g to 54 J/g and very particularly preferably in the range of from 99 J/g to 63 J/g.

The crystalline or partly crystalline polyurethane polymers therefore contain as builder components
A) one or more difunctional or more than difunctional polyester polyols with a number-average molecular weight of from 400 to 5,000 daltons, preferably from 1,000 to 3,000 daltons, particularly preferably from 1,500 to 2,500 daltons, B) optionally one or more difunctional or more than difunctional polyol component(s) with a number-average molecular weight of from 62 to 399 daltons, C) at least one component which contains sulfonate and/or carboxylate groups and which furthermore has at least one isocyanate-reactive hydroxyl and/or amino group and thus leads to terminal or lateral sulfonate or, respectively, carboxylate structural units, D) one or more di- or polyisocyanate component(s) and E) optionally one or more diamino and/or monoamino compounds F) optionally other isocyanate-reactive compounds.

Preferred di- or more than difunctional polyester polyols A) are based on linear dicarboxylic acids and/or derivatives thereof, such as anhydrides, esters or acid chlorides, and aliphatic or cycloaliphatic, linear or branched polyols. Dicarboxylic acids chosen from the group consisting of adipic acid, succinic acid, sebacic acid and dodecandioic acid are particularly preferred, and adipic acid is very particularly preferred as component A). These are employed in amounts of at least 80 mol %, preferably from 85 to 100 mol %, particularly preferably from 90 to 100 mol %, based on the total amount of all the carboxylic acids.

Other aliphatic, cycloaliphatic or aromatic dicarboxylic acids can optionally be co-used. Examples of such dicarboxylic acids are glutaric acid, azelaic acid, 1,4-, 1,3- or 1,2-cyclohexanedicarboxylic acid, terephthalic acid or isophthalic acid. These are employed in amounts of up to a maximum of 20 mol %, preferably from 0 to 15 mol %, particularly preferably from 0 to 10 mol %, based on the total amount of all the carboxylic acids.

Preferred polyol components for the polyesters A) are chosen from the group consisting of monoethylene glycol, propane-1,3-diol, butane-1,4-diol, pentane-1,5-diol, hexane-1,6-diol and neopentyl glycol, butane-1,4-diol and hexane-1,6-diol are particularly preferred as the polyol component, and butane-1,4-diol is very particularly preferred. These are employed in amounts of at least 80 mol %, preferably from 90 to 100 mol %, based on the total amount of all the polyols.

Other aliphatic or cycloaliphatic, linear or branched polyols can optionally be co-used. Examples of such polyols are diethylene glycol, hydroxypivalic acid neopentyl glycol, cyclohexanedimethanol, pentane-1,5-diol, pentane-1,2-diol, nonane-1,9-diol, trimethylolpropane, glycerol or pentaerythritol. These are employed in amounts of a maximum of 20 mol %, preferably from 0 to 10 mol %, based on the total amount of all the polyols.

Mixtures of two or more such polyesters A) are also possible.

Polyesters A) based on adipic acid and 1,4-butanediol or adipic acid and 1,6-hexanediol or adipic acid and a mixture of 1,6-hexanediol and neopentyl glycol are preferably employed.

Difunctional or more than difunctional polyol components with a number-average molecular weight of from 62 to 399 daltons, such as, for example, polyethers, polyesters, polycarbonates, polylactones or polyamides, are suitable as builder component B).

Further suitable components B) are the aliphatic or cycloaliphatic, linear or branched polyols mentioned under A). Preferred components B) are monoethylene glycol, butane-1,4-diol or hexane-1,6-diol, Butane-1,4-diol is particularly preferred.

Suitable components C) containing sulfonate or carboxylate groups are e.g. diamino compounds or dihydroxy compounds which additionally carry sulfonate and/or carboxylate groups, such as, for example, the sodium, lithium, potassium and tert-amine salts of N-(2-aminoethyl)-2-aminoethanesulfonic acid, of N-(3-aminopropyl)-2-aminoethanesulfonic acid, of N-(3-aminopropyl)-3-aminopropanesulfonic acid, of N-(2-aminoethyl)-3-aminopropanesulfonic acid, of the analogous carboxylic acids, of dimethylolpropionic acid, of dimethylolbutyric acid or of the reaction products in the sense of a Michael addition of 1 mol of diamine, such as e.g. 1,2-ethanediamine or isophoronediamine, with 2 mol of acrylic acid or maleic acid.

Preferred components C) are N-(2-aminoethyl)-2-aminoethanesulfonate or dimethylolpropionate.

The acids are preferably employed directly in their salt form as sulfonate or carboxylate. However, it is also possible for a proportion or all of the neutralizing agent needed for the salt formation to be first added during or after the preparation of the polyurethanes.

tert-Amines which are particularly suitable and preferred for the salt formation are e.g. triethylamine, dimethylcyclohexylamine and ethyldiisopropylamine.

Other amines can also be employed for the salt formation, such as ammonia, diethanolamine, triethanolamine, dimethylethanolamine, methyldiethanolamine, aminomethylpropanol and also mixtures of the amines mentioned and also of other amines. These amines are appropriately added only after the isocyanate groups have largely reacted.

It is also possible to employ other neutralizing agents for neutralization purposes, such as e.g. sodium, potassium, lithium or calcium hydroxide.

Organic compounds which have at least two free isocyanate groups per molecule are preferably suitable as builder components D). Diisocyanates Y(NCO)2, wherein Y represents a divalent aliphatic hydrocarbon radical having 4 to 12 carbon atoms, a divalent cycloaliphatic hydrocarbon radical having 6 to 15 carbon atoms, a divalent aromatic hydrocarbon radical having 6 to 15 carbon atoms or a divalent aralyphatic hydrocarbon radical having 7 to 15 carbon atoms, are preferably employed. The diisocyanates are particularly preferably chosen from the group consisting of tetramethylene-diisocyanate, methylpentamethylene-diisocyanate, hexamethylene-diisocyanate, dodecamethylene-diisocyanate, 1,4-diisocyanatocyclohexane, 1-isocyanato-3,3,5-trimethyl-5-isocyanatomethylcyclohexane, 4,4'-diisocyanatodicyclohexylmethane, 4,4'-diisocyanato-2,2-dicyclohexylpropane, 1,4-diisocyanatobenzene, 2,4-diisocyanatotoluene, 2,6-diisocyanatotoluene, 4,4'-diisocyanatodiphenylmethane, 2,2'- and 2,4'-diisocyanatodiphenylmethane, tetramethylxylyene-diisocyanate, p-xylylene-diisocyanate and p-isopropylidene-diisocyanate and mixtures consisting of these compounds.

It is of course also possible for a proportion of the more highly functional polyisocyanates known per se in polyurethane chemistry or also modified polyisocyanates known per se, for example containing carbodiimide groups, allophanate groups, isocyanurate groups, urethane groups and/or biuret groups, to be co-used.

Diisocyanates D) are very particularly preferably chosen from the group consisting of hexamethylene-diisocyanate, 1,4-diisocyanatocyclohexane, 1-isocyanato-3,3,5-trimethyl-5-isocyanatomethylcyclohexane, 4,4'-diisocyanatodicyclohexylmethane and 4,4'-diisocyanato-2,2-dicyclohexylpropane and mixtures consisting of these compounds.

2,4-Diisocyanatotoluene and 2,6-diisocyanatotoluene and mixtures thereof are likewise still further preferred as component D).

Still further preferred builder components D) are mixtures of hexamethylene-diisocyanate and 1-isocyanato-3,3,5-trimethyl-5-isocyanatomethylcyclohexane.

Primary and/or secondary monoamino compounds and/or primary and/or secondary diamino compounds are possible as builder component E).

Aliphatic and/or alicyclic primary and/or secondary monoamines, such as ethylamine, diethylamine, the isomeric propyl- and butylamines, higher linear aliphatic monoamines and cycloaliphatic monoamines, such as cyclohexylamine, are preferred as component E). Further examples of component E) are amino alcohols, i.e. compounds which contain amino and hydroxyl groups in one molecule, such as e.g. ethanolamine, N-methylethanolamine, diethanolamine and 2-propanolamine. Mixtures of several monoamino compounds can of course also be employed.

Particularly preferred monoamino compounds are chosen from the group consisting of diethylamine, ethanolamine and diethanolamine. Diethanolamine is very particularly preferred.

Particularly preferred diamino compounds are chosen from the group consisting of 1,2-ethanediamine, 1,6-hexamethylenediamine, 1-amino-3,3,5-trimethyl-5-aminomethylcyclohexane (isophoronediamine), piperazine, 1,4-diaminocyclohexane and his-(4-aminocyclohexyl)-methane. Diamino compounds which are furthermore particularly preferred are amino compounds such as, for example, 1,3-diamino-2-propanol, N-(2-hydroxyethyl)-ethylenediamine and N,N-bis(2-hydroxyethyl)-ethylenediamine. Adipic acid dihydrazide, hydrazine and hydrazine hydrate are furthermore possible as component E). Polyamines, such as diethylenetriamine, can also be employed as component E) instead of a diamino compound.

Preferred components F) which are optionally to be co-used are e.g. aliphatic, cycloaliphatic or aromatic monoalcohols having 2 to 22 C atoms, such as ethanol, butanol, hexanol, cyclohexanol, isobutanol, benzyl alcohol, stearyl alcohol and 2-ethylethanol; mono- or difunctional polyethers which are based on ethylene oxide polymers or ethylene oxide/propylene oxide copolymers started on alcohols or amines and have a hydrophilizing action, such as e.g. Polyether LB 25 (Bayer MaterialScience AG; Germany) or MPEG 750: methoxypolyethylene glycol, molecular weight 750 g/mol (e.g. Pluriol® 750, BASF AG, Germany); blocking agents which are usual for isocyanate groups and can be split off again at elevated temperature, such as e.g. butanone oxime, dimethylpyrazole, caprolactam, malonates, triazole, dimethyltriazole, tert-butylbenzylamine and cyclopentanone carboxyethyl ester; and unsaturated compounds containing groups accessible for polymerization reactions, such as e.g. hydroxyethyl acrylate, hydroxyethyl methacrylate, hydroxybutyl acrylate, hydroxybutyl methacrylate, hydroxypropyl acrylate, hydroxypropyl methacrylate, pentaerythritol trisacrylate and hydroxy-functional reaction products of monoepoxides, bisepoxides and/or polyepoxides with acrylic acid or methacrylic acid.

The polyurethane according to the invention can contain components F) in amounts of from 0 to 20, preferably from 0 to 10 wt. %.

The aqueous dispersion for preparing the adhesive layer can further comprise auxiliary substances and additives known in coatings and adhesives technology, in particular emulsifiers or light stabilizers, such as UV absorbers or sterically hindered amines (HALS), furthermore antioxidants, fillers or auxiliary substances, e.g. antisettling agents, defoaming and/or wetting agents, flow agents, reactive diluents, plasticizers, catalysts, auxiliary solvents and/or thickeners and additives, such as, for example, pigments, dyestuffs or matting agents. Tackifying resins ("tackifiers") can also be added. Tackifying resins are to be understood as meaning all natural or synthetic resins or polymers which as additives increase the tack, that is to say the property of adhering firmly to surfaces after briefly pressing on gently. In order to achieve this, adhesive resins must have, inter alia, an adequate compatibility with the polymers. Tackifiers themselves do not need to have tack. Tackifiers which are widely employed are, inter alia, terpene oligomers, aliphatic petrochemical resins and colophony resins. The additives can be added to the aqueous dispersions directly before processing. However, it is also possible to add at least a portion of the additives before, during or after the dispersing of the binder.

If an aqueous polymer dispersion is used as the starting point, a further advantage lies in the fact that surface-inactivated polyisocyanates having a melting point or glass transition temperature in the range from 40 to 150° C. can also be incorporated without problem. The crosslinking temperatures can be in the range from 35° C. to 90° C. With these low crosslinking temperatures even temperature-sensitive substrates can be bonded with this one-component system under exposure to heat.

Additionally, using an aqueous dispersion for preparing the adhesive layer (D) avoids migration of organic solvents into the base film layer. Such migration of organic solvents into the base film layer can result in later stress corrosion cracking of the base film layer.

The layer obtained from the aqueous suspension, dispersion or solution can be stored for months. The storage period at room temperature or at slightly elevated temperatures differs, however, depending on the solution characteristics of the solid film for the polyisocyanate. The storage period for the system according to the invention in the anhydrous and uncrosslinked state is at least three times, conventionally more than ten times that of the same mixture with the same polyisocyanates which are not surface-deactivated. The adhesive layer (D) is storage-stable at room temperature for at least 6 months. The term "latent-reactive" denotes the state of the substantially anhydrous layer in which the surface-deactivated polyisocyanate and the isocyanate-reactive polymer are present in the substantially uncrosslinked state.

Another advantage of using a decorative film comprising the adhesive layer (D) is the use of water as a dispersion medium. Energy consumption is little to produce a dispersion material. The component part of an organic solvent is very small, leading to a treatment very advantageous to environments.

The heat for thermoplastic processing and for crosslinking can preferably be supplied by convection heat or radiant heat. The stable aqueous suspension, dispersion or solution of surface-deactivated fine-particle polyisocyanates and dispersed or water-soluble polymers with isocyanate-reactive groups can be applied to the surface of the substrate to be bonded or coated, in particular by brushing, spraying, atomising, knife application, trowel application, pouring, dipping, extruding or by roller application or by printing.

The latent-reactive layer formed with an adhesive layer formed in a multilayer decorative film is used as a thermally bondable adhesive bond preferably for a soft or hard base substance such as metal, plastic, glass, wood, wood composite, thick paper, foil, synthetic surface web, and textile. It is also effective for bonding of hardly adhesive base substance such as aluminum and magnesium.

One preferable embodiment of the present invention include an aspect that after a multilayer decorative film of the present invention is overlaid (or formed) on a base substance (or base substance film) through an adhesive layer by heating at 70° C. or more, preferably 100° C. or more, for example, at 150° C. for less than 5 minutes, preferably for 5 to 120 seconds, more preferably for 10 to 90 seconds, the adhesive layer (D) undergoes cross-linking.

The cross-linking is started by a heat treatment when the multilayer decorative film is attached to a base substance, and in a suitable case, this is conducted after further mechanical or thermal processing.

In compounding the above-described surface-inactivated polyisocyanate in the above-described isocyanate reactive polymer, it is desirable that using additives such as surfactant and thickener, a master batch is previously produced, and compounded. The surfactant is preferably glycol ether type, and the thickener is preferably acrylic and urethane type, but they are not particularly restricted.

The multilayer decorative film of the present invention is preferably characterized in that it has a degree of elongation of 10 to 1000%, preferably of 50 to 1000%.

The multilayer decorative film of the present invention is preferably characterized in that it has a tensile strength of 50 to 1000 kg/cm².

The multilayer decorative film of the present invention is preferably characterized in that it has a processing temperature of 70 to 220° C., preferably of 70 to 200° C.

The multilayer decorative film of the present invention is preferably characterized in that it has an adhesiveness of 50 N/25 mm or more.

The multilayer decorative film of the present invention is preferably characterized in that it has a durability of 1 week or more under the condition at 80° C. and 98% RH.

In a preferred embodiment the multilayer decorative film of the present invention is preferably characterized in that as requirements on a decorative film for a three dimension overlay method requiring no air hole and vacuum hole inside the structure of a mold in vacuum forming and optionally additional pneumatic forming, it has a degree of elongation of 10 to 1000%, preferably of 50 to 1000%, a tensile strength of 50 to 1000 kg/cm², a processing temperature of 70 to 220° C., preferably of 70 to 200° C., adhesiveness of 50 N/25 mm or more, and durability of 1 week or more under the condition at 80° C. and 98% RH.

The multilayer decorative film of the present invention is a multilayer decorative film excellent in adhesiveness, workability, and secondary physical properties such as heat resistance and hydrolysis resistance after forming. Since this multilayer decorative film shows excellent adhesiveness to various base substances such as metal and plastic base materials by vacuum forming or thermo forming, in particular by vacuum forming, for example, Three dimensional Overlay Method ("TOM process"), it can be utilized not only for decoration in applications of cellular phone, package of personal computer, air conditioner, television, refrigerator, and car interior, but also in severe applications requiring durability such as wet heat resistance including car exterior.

EXAMPLES

Hereinafter, the present invention is specifically explained by Examples, but the present invention is not limited thereto.

Example 1

After a design layer (C) was formed using a screen printing technique on a polycarbonate film (base film layer B) (manufactured by Bayer Material Science Ltd.) that a PMMA (hard coat layer A) was coextruded total 375 μm thick, an adhesive prepared by the compounding shown in Table 1 was coated (adhesive layer D) for the thickness to be 30 μm in dry by a knife coater, then dried at 50° C. to obtain a multilayer decorative film.

TABLE 1

Table 1: Composition of adhesive

| (Name of component) | (pbw) [1] |
|---|---|
| Water | 62.8 |
| Special amine [2] | 2.2 |
| Polyglycol ether [3] | 1.37 |
| Acrylic thickener [4] | 57.1 |
| IPDI trimer [5] | 76.5 |
| Dispercoll U [6] | 800.0 |

[1] pbw: parts by weight
[2] Special amine: polyetheramine (manufactured by BASF Corporation)
[3] Polyglycol ether: Emulvin W (manufactured by LANXESS Corporation)
[4] Acrylic thickener: Borchigel ALA (manufactured by Borchers Corporation)
[5] IPDI trimer: isocyanurate cyclic trimer of isophorone diisocyanate
[6] Dispercoll U: polyester polyurethane dispersion (manufactured by Bayer Material Science Ltd.): solid content = 50 weight %

Comparative Example 1

After a design layer was formed using a screen printing technique on a polycarbonate film that a PMMA was coextruded total 375 μm thick, an acrylic resin tacky adhesive commercially available (pressure sensitive adhesive (PSA): MCS65) was coated for the thickness to be 25 μm in dry by a knife coater, then dried at 50° C. to obtain a multilayer decorative film.

Comparative Example 2

After a design layer was formed using a screen printing technique on a polycarbonate film that a PMMA was coextruded total 375 μm thick, Dispercoll U adjusted in viscosity with an acrylic thickener was coated for the thickness to be 30 μm in dry by a knife coater, then dried at 50° C. to obtain a multilayer decorative film.

Evaluation Methods:

Using the multilayer decorative films produced in accordance with the above-described methods, by a NGF-0690 machine (manufactured by Fu-se Vacuum Forming Co., Ltd.), the adhesion samples each subjected to vacuum forming decoration onto polycarbonate (PC), polyethylene terephthalate (PET), polyacrylonitrile-butadiene-styrene (ABS), and an electrocoated steel sheet were prepared, and the following evaluation was carried out.

Adhesiveness: Test Result 1

A film of the adhesion sample cut to 25 mm width was measured for peel strength in 180° peeling under an atmosphere at 23° C.

For measuring the peel strength was used a universal tensile testing machine (AG-1 10 kN from SHIMADZU CORPORATION) and a haul-off speed of 100 mm/min.

Heat Resistance: Test Result 2

A film of the adhesive sample cut to 50 mm length and 25 mm width was measured for peel length after one hour in 180° under a 500 g load in a predetermined temperature condition. Regarding the one that dropped within one hour, the time lapse until it dropped was recorded.

Wet Heat Resistance: Test Result 3

A film of the adhesion sample cut to 50 mm length and 25 mm width was left to stand under the condition at 80° C. and 98% RH for one week, then a sample which was aged under an atmosphere at 23° C. for one day was measured for peel strength in 180° peeling under an atmosphere at 23° C., and the retention of the adhesion strength was examined.

For measuring the peel strength was used a universal tensile testing machine (AG-1 10 kN from SHIMADZU CORPORATION) and a haul-off speed of 100 mm/min.

Test Result 1

Table 2 shows the test result of adhesiveness when the decorative film obtained in Example 1 was applied to each substance to be attached shown in Table 2.

TABLE 2

Table 2 Test result of adhesiveness

| Base film thickness (μm) | Adhesive layer | 180° peel strength (N/25 mm) Substance to be attached | | | |
|---|---|---|---|---|---|
| | | PC | PET | ABS | Electrocoated steel sheet |
| 175 | Dispercoll U + surface-inactivated polyisocyanate (Example 1) | 115 | 112 | 122 | 131 [1] |
| | PSA (Comparative example 1) | 38 | 41 | 41 | 41 |
| 375 | Dispercoll U + surface-inactivated polyisocyanate (Example 1) | 158 | 160 [2] | 158 [2] | 144 [2] |
| | PSA (Comparative example 1) | 38 | 41 | 41 | 41 |

[1] partly material breakage of electrocoated layer
[2] material breakage of decorative film From the result of Table 2, when the decorative film in Example 1 was applied to each substance to be attached, it had a strength about 3 to 4 times higher than that of Comparative example 1 where an acrylic resin tacky adhesive PSA was coated.

Test Result 2

Table 3 shows the test result of heat resistance when the decorative film in Example 1 was applied to the electrocoated steel sheet, substance to be attached.

TABLE 3

Table 3 Test result of heat resistance

| Base film thickness (μm) | Adhesive layer | 180° creep characteristic Substance to be attached: Elctrocoated steel sheet Test temperature | | |
|---|---|---|---|---|
| | | 80° C. | 110° C. | 130° C. |
| 175 | Dispercoll U (Comparative example 2) | Failure (peeled in 6 sec) | (not tested) | (not tested) |
| | Dispercoll U + surface-inactivated polyisocyanate (Example 1) | Success (not peeled) | Success (not peeled) | Success (not peeled) |
| | PSA (Comparative example 1) | Failure (peeled in 5 sec) | (not tested) | (not tested) |

When the decorative film in Example 1 was applied to the following substance to be attached, good heat resistance was obtained even at 130° C., whereas the uncured system (Comparative example 2) and Comparative example 1 where PSA was coated were unable to hold a 500 g load at 80° C. in about 5 seconds, and dropped.

Test Result 3

Table 4 shows the test result of wet heat resistance when the decorative film in Example 1 was applied to each substance to be attached shown in Table 4.

TABLE 4

Table 4 Hydrolysis resistance (treating condition: 80° C. × 98% RH × 1 week)

| Base film thickness (μm) | Adhesive layer | 180° peel strength (N/25 mm) Substance to be attached | | | |
|---|---|---|---|---|---|
| | | PC Initial value | PET After hydrolysis test | ABS Initial value | Electrocoated steel sheet After hydrolysis test |
| 175 | Dispercoll U + surface-inactivated polyisocyanate (Example 1) | 97 | 90 | 103 | 112 |
| | PSA (Comparative example 1) | 41 | 20 | 41 | 27 |

In the case of using the decorative film that the adhesive layer in Example 1 was coated, for both the ABS and electrocoated steel sheet as a substance to be attached, no deterioration of adhesion strength after hydrolysis test was observed, showing good wet heat resistance, whereas regarding Comparative example 1 where PSA was coated, the adhesion strength after test was decreased in half.

The invention claimed is:

1. A process for overlaying a base substance with a multilayer decorative film by thermo forming or vacuum forming, comprising
    (i) providing a multilayer decorative film comprising a hard coat layer (A), an adhesive layer (D), a base film layer (B) and optionally a design layer (C) between these layers (A) and (D), wherein the adhesive layer (D) comprises at least one latent reactive adhesive,
    (ii) applying the adhesive layer (D) of said decorative film to the surface of a base substance, and
    (iii) overlaying said base substance with said decorative film by heating at 70° C. or more for 5 seconds to 5 minutes, wherein the adhesive layer (D) of the multilayer decorative film comprises at least one solid polyisocyanate (D1) with a melting point or a glass transition temperature of at least higher than 40° C. and a particle size of 200 μm or less, and at least one isocyanate reactive polymer (D2).

2. The process according to claim 1, wherein the base substance is a three dimensional substrate.

3. The process according to claim 1, wherein the process is a vacuum forming process requiring no air hole and vacuum hole inside the structure of a mold in vacuum forming.

4. The process according to claim 1, wherein the process is a vacuum forming process succeeded by further treatment with compressed air.

5. The process according to claim 1, wherein the at least one solid polyisocyanate (D1) is surface-inactivated.

6. The process according to claim 1, wherein the adhesive layer (D) of the multilayer decorative film provided in step (i) is prepared by
  (a) mixing an aqueous dispersion material of at least one polyisocyanate (D1) and at least one isocyanate reactive polymer (D2) suspended or dissolved in water;
  (b) depositing the dispersion material of step (a) on a substrate to form a layer; and
  (c) removing water from the layer obtained in the process step (b) at a temperature lower than the reaction temperature of the polyisocyanate (D1) to produce a solid adhesive layer of latent reactivity.

7. The process according to claim 1, wherein the adhesive layer (D) does not comprise a release paper.

* * * * *